(12) United States Patent
Das et al.

(10) Patent No.: US 9,756,669 B2
(45) Date of Patent: Sep. 5, 2017

(54) METHOD OF ESTABLISHING A MOBILE-TERMINATED PACKET DATA CONNECTION

(71) Applicant: General Motors LLC, Detroit, MI (US)

(72) Inventors: Swapan Das, Canton, MI (US); David George, Sterling Heights, MI (US); Mohammad Ishfaq, Northville, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/676,785

(22) Filed: Nov. 14, 2012

(65) Prior Publication Data
US 2014/0133392 A1    May 15, 2014

(51) Int. Cl.
*H04W 76/02* (2009.01)
*H04L 29/12* (2006.01)
*H04L 29/08* (2006.01)

(52) U.S. Cl.
CPC ....... *H04W 76/022* (2013.01); *H04L 61/1511* (2013.01); *H04L 67/12* (2013.01); *H04L 67/141* (2013.01); *H04L 67/18* (2013.01); *H04L 61/2076* (2013.01)

(58) Field of Classification Search
CPC ..... H04W 12/06; H04W 4/046; H04W 12/12; H04W 76/02; H04W 76/021; H04W 76/022; H04L 29/12066; H04L 61/1511; H04L 61/2015; H04L 61/15; H04L 61/1552; H04L 61/2503; H04L 51/12; H04L 12/584; H04L 67/18; H04L 67/141; H04L 67/1511; H04L 67/12; H04L 61/2076
USPC .... 370/328, 252, 254, 310, 310.2, 313, 331, 370/338, 351, 389, 392, 465, 471, 474, 370/475; 709/223–232
See application file for complete search history.

(56) References Cited

U.S. PATENT DOCUMENTS

| 7,680,876 | B1 | 3/2010 | Cioli et al. |
| 8,219,710 | B2 | 7/2012 | Yi et al. |
| 8,566,589 | B1* | 10/2013 | Satish ............ 713/168 |
| 2003/0103482 | A1* | 6/2003 | Van Bosch ........ 370/338 |
| 2003/0154306 | A1 | 8/2003 | Perry |
| 2006/0013158 | A1* | 1/2006 | Ahuja et al. ....... 370/328 |
| 2006/0161975 | A1* | 7/2006 | Diez et al. ........ 726/18 |

(Continued)

FOREIGN PATENT DOCUMENTS

CN    101170825 A    4/2008
CN    101567888 A    10/2009

*Primary Examiner* — Kwang B Yao
*Assistant Examiner* — Ricardo Castaneyra
(74) *Attorney, Agent, or Firm* — Christopher DeVries; Reising Ethington P.C.

(57) ABSTRACT

A method of establishing a packet data connection includes accessing a Domain Name Server (DNS) to obtain an Internet Protocol (IP) address of a vehicle telematics unit; initiating a mobile-terminated packet data connection with the vehicle telematics unit using the IP address of the vehicle telematics unit; and establishing the mobile-terminated packet data connection when the vehicle telematics unit determines that a hostname representing an IP address of a third party initiating the mobile-terminated packet data connection matches at least one approved hostname recognized by the vehicle telematics unit.

7 Claims, 3 Drawing Sheets

(56) References Cited

U.S. PATENT DOCUMENTS

| | | | |
|---|---|---|---|
| 2006/0253895 A1* | 11/2006 | Brandofino et al. .............. 726/2 |
| 2008/0102854 A1* | 5/2008 | Yi et al. ..................... 455/456.1 |
| 2008/0147837 A1* | 6/2008 | Klein et al. ................... 709/223 |
| 2009/0328139 A1* | 12/2009 | Kitamura ............ H04L 29/1232 |
| | | | 726/2 |
| 2010/0037046 A1* | 2/2010 | Ferg ........................ H04L 9/321 |
| | | | 713/155 |
| 2010/0131646 A1* | 5/2010 | Drako ............... H04L 29/12066 |
| | | | 709/225 |
| 2010/0167721 A1* | 7/2010 | Madhavan et al. ........ 455/426.1 |
| 2012/0079055 A1* | 3/2012 | Robinson ..................... 709/213 |
| 2013/0085914 A1* | 4/2013 | McPherson ......... H04L 61/1511 |
| | | | 705/34 |
| 2013/0179551 A1* | 7/2013 | Li .............................. 709/223 |

\* cited by examiner

METHOD OF ESTABLISHING A MOBILE-TERMINATED PACKET DATA CONNECTION

TECHNICAL FIELD

The present invention relates to wireless devices and more particularly to mobile-terminated packet connections with wireless devices.

BACKGROUND

Wireless devices, such as cell phones and vehicle telematics units, carry out voice and data communications with third parties. These communications often involve wirelessly sending packetized data through a wireless carrier system. As part of communicating this way, both the wireless device as well as the third party each may use a distinct IP address so that the communications between them are routed appropriately. To set up a communication session between the wireless device and the third party, the entity setting up the session (whether it is the device or the third party) must know the IP address of the other entity in order to communicate data. However, the IP addresses of wireless devices may not be accessible by third parties that want to send wireless devices packetized data. A benefit of this arrangement is that unwanted mobile-terminated packet data connections can be prevented because the IP addresses of the wireless/mobile devices are not available to malicious third parties. But this scheme also prevents legitimate mobile-terminated packet data connections placed by trusted third parties as well.

SUMMARY

According to an embodiment, there is provided a method of establishing a packet data connection. The method includes accessing a Domain Name Server (DNS) to obtain an Internet Protocol (IP) address of a vehicle telematics unit; initiating a mobile-terminated packet data connection with the vehicle telematics unit using the IP address of the vehicle telematics unit; and establishing the mobile-terminated packet data connection when the vehicle telematics unit determines that a hostname representing an IP address of a third party initiating the mobile-terminated packet data connection matches at least one approved hostname recognized by the vehicle telematics unit.

According to another embodiment, there is provided a method of establishing a packet data connection. The method includes receiving at a vehicle telematics unit a request to communicate via packet data that includes an Internet Protocol (IP) address; sending the IP address to a Domain Name Server (DNS) for a reverse DNS lookup; receiving in response to the reverse DNS lookup a hostname from the DNS corresponding to the IP address; comparing the received hostname with one or more approved hostnames; and selectively permitting or denying the request based on the comparison.

According to yet another embodiment, there is provided a method of establishing a packet data connection. The method includes receiving at a selectively-accessible Domain Name Server (DNS) an IP address assigned by a wireless carrier system to a vehicle telematics unit; providing a hostname of the vehicle telematics unit to the selectively-accessible DNS; obtaining the IP address assigned by the wireless carrier system from the selectively-accessible DNS in response to providing the hostname; and establishing the mobile-terminated packet data connection to the vehicle telematics unit using the obtained IP address.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below selectively permits packet data communication sessions that are mobile-terminated (i.e., are not originated from a vehicle telematics unit but rather to the vehicle telematics unit). This can be carried out in two main ways. First, a domain name server (DNS) can maintain a current list of IP addresses that are assigned to wireless devices, such as vehicle telematics units. Each time a vehicle telematics unit is assigned an IP address, the IP address of that unit can be recorded in the DNS. That way, the DNS can maintain a list of current IP addresses assigned to each vehicle telematics unit. In addition to maintaining a list, the DNS can also selectively permit third parties to access the contents of that server. Generally speaking, when a wireless device, such as the vehicle telematics unit, sends packetized data to a destination, it can connect with a base station of a wireless carrier system, be assigned an IP address by the wireless carrier system, obtain the IP address of the destination for the packetized data the vehicle telematics unit is sending, and send the packetized data to the IP address of the destination. But without a DNS to monitor/update the IP addresses of the vehicle telematics units and provide them to third parties, a third party cannot contact the vehicle telematics unit because the IP address of the vehicle telematics units are essentially unknown. That is, if a third party wanted to contact a vehicle telematics unit to establish a data connection, the IP address of the device would not be accessible. Thus, a DNS to maintain a current list of IP addresses that can be selectively provided to trusted sources can allow certain third parties to contact vehicle telematics units.

Apart from and/or in addition to the private/limited access DNS, the wireless device (e.g., vehicle telematics unit) can control the ability of a third party to establish mobile-terminated packet data sessions. In this case, it is unimportant whether access to the DNS is selectively provided. The vehicle telematics unit can be instructed to validate requests to establish a packet-data session based on the hostname associated with the IP address of the third party. For instance, the vehicle telematics unit may be instructed to accept packet data communication sessions from one approved hostname. The vehicle telematics unit can then be assigned an IP address by the wireless carrier system, which reports the IP address to the DNS. When a third party attempts to communicate with the vehicle telematics unit, it receives the IP address used by the third party. The vehicle telematics unit can then send the IP address used by the third party to a DNS for a reverse domain name lookup. The lookup can provide a hostname associated with the IP address used by the third party. If the hostname associated with the IP address used by the third party is the same as the approved hostname, the vehicle telematics unit can permit the packet data communication session to proceed; otherwise, the vehicle telematics unit can block the session. A benefit of this is the approved third party can change its IP address without adversely affecting the chance that the approved third party will successfully communicate with the vehicle telematics unit. So long as the hostname of the third party is constant, the third party can be recognized by the vehicle telematics unit. In contrast, some vehicle telematics units can allow/deny communications based on IP addresses stored at the vehicle telematics units. But if the IP addresses for the trusted third parties change, those third parties cannot contact the vehicle telematics unit using new IP addresses. Moreover, the vehicle telematics units having several trusted IP addresses could be hacked into and those trusted IP addresses could be learned by third parties that should not have access the vehicle.

The system and method described herein can be effectively used with a 4G/LTE cellular protocol. When a 4G/LTE cellular protocol is used, the wireless carrier system 14 can implement a secure/private cellular packet data IP network for wireless devices, such as vehicle telematics units, and can facilitate IP connections at any time. That is, the vehicle can always be associated with an assigned IP address so that packet data communications can be carried out with the vehicle at any time. In other systems, a mobile-terminated connection with the vehicle telematics unit 30 could be initiated with a SMS message that instructed the vehicle telematics unit to place a call. But resolving IP addresses using a DNS is much faster.

Figure 1:
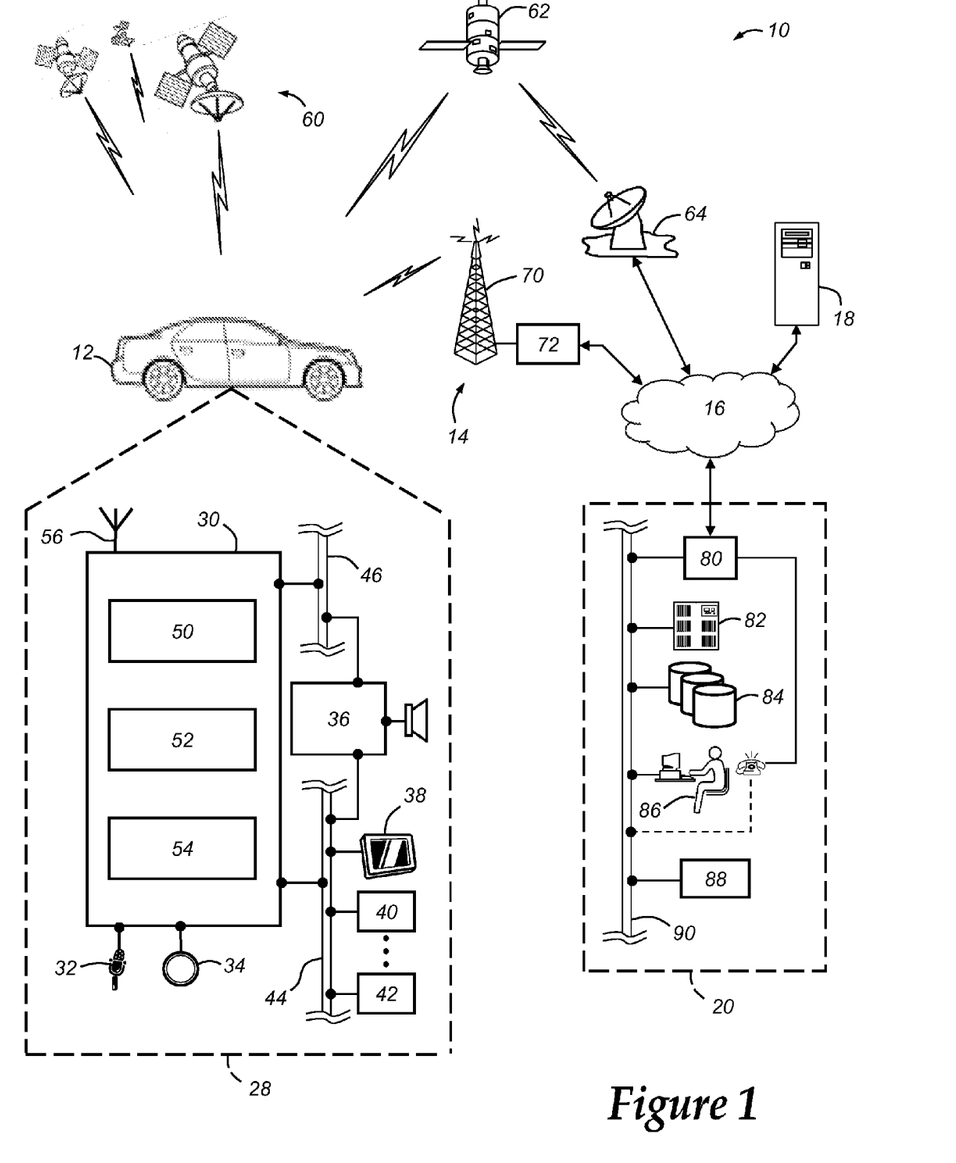
FIG. 1 is a block diagram depicting an embodiment of a communications system that is capable of using the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
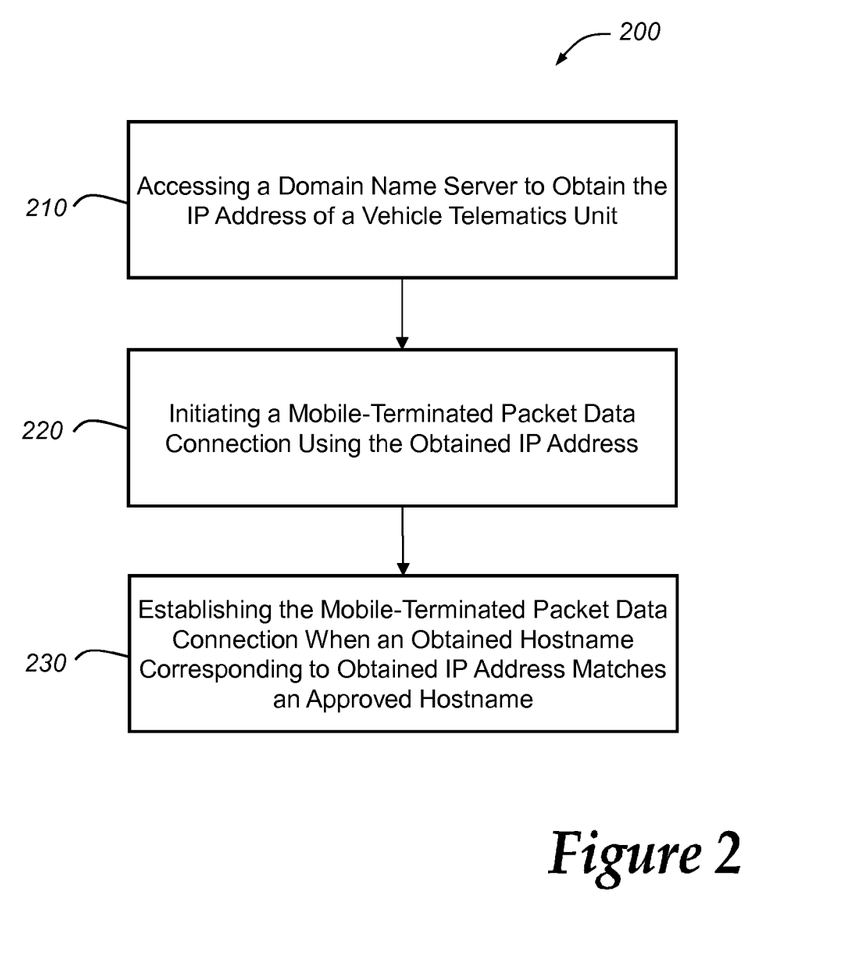
FIG. 2 is a flow chart depicting an embodiment of a method of establishing a packet data connection.

Turning now to FIG. 2, there is shown an exemplary embodiment of a method 200 of establishing a mobile-terminated packet data connection. The method 200 begins at step 210 by accessing a Domain Name Server (DNS). The DNS can be communicatively linked to the wireless carrier system 14 so that when the vehicle telematics unit 30 is assigned an IP address by the system 14, the DNS is informed of the assignment. In an example of how this can be implemented, the wireless carrier system 14 can assign an IP address to the vehicle telematics unit 30 and then send the IP address along with a vehicle identifier, such as a hostname, through the land network 16 to the DNS, which can be maintained at the computer 18. One example of the hostname could be "VIN@OnStar.com." It should be appreciated that the DNS can exist in a variety of locations. For example, while the DNS is described with respect to computer 18, it can also be maintained by the wireless carrier system 14 or could alternatively be kept at the call center 20. Regardless of its location, the DNS can receive updates from the wireless carrier system 14 whenever the vehicle telematics unit 30 receives an IP address and whenever the IP address changes.

The DNS can take various forms. In some implementations, the DNS can be a primary server, such as a Dynamic Domain Name Server (DDNS) that dynamically assigns IP addresses to vehicle telematics unit 30. In that sense, the primary DNS (DDNS) can monitor and regulate which vehicle telematics units 30 are assigned individual IP addresses and can be maintained by the wireless carrier system 14. Along with the primary DNS, a secondary DNS can be maintained apart from the primary DNS. The secondary DNS can mirror the information included in the primary DNS so that the secondary DNS includes a current list linking the hostname of vehicle telematics units with the IP addresses used at any given moment. When the primary DNS assigns an IP address to a vehicle telematics unit 30, the primary DNS can inform the secondary DNS of this assignment. This can occur when the vehicle telematics unit 30 has either been assigned an IP address or the IP address of that unit 30 has changed. In some implementations it is possible that the primary DNS and the secondary DNS are the same. For instance, the wireless carrier system 14 could permit a trusted third party, such as the call center 20, to access the primary DNS that the system 14 uses to assign IP addresses. In this case, a secondary DNS may not be needed as the primary DNS could both assign IP addresses to vehicle telematics units 30 as well as resolve requests from third parties (e.g., call center 20) for vehicle telematics unit IP addresses. The method 200 proceeds to step 220.

At step 220, a mobile-terminated packet-data connection is initiated with the vehicle telematics unit 30 using the IP address. A third party, such as the call center 20, can be permitted access to the DNS (primary or secondary) for obtaining the IP address of a vehicle telematics unit 30 the center 20 will contact. When the call center 20 (or other third party) decides to contact the vehicle telematics unit 30, the center 20 can contact the DNS with the identity of the vehicle telematics unit 30 (e.g., hostname) that the center 20 wants to contact. Depending on who maintains the DNS, the server may or may not authenticate the identity of the call center 20. For instance, if the DNS is maintained by the call center 20, the computer 18, or some other location/hardware maintained by the telematics service provider, such an authentication may not be necessary. However, if the DNS is maintained by the wireless carrier system 14, security measures may be employed to confirm the identity of the call center 20. When the call center 20 has been properly authenticated (if needed), the call center 20 receives the IP address associated with the vehicle telematics unit 30. The call center 20 can then use the IP address to contact the vehicle telematics unit 30 assigned to the IP address and attempt to establish the packet-data connection. The method 200 proceeds to step 230.

At step 230, the mobile-terminated packet-data connection is established when the vehicle telematics unit 30 determines that a hostname representing an IP address of the call center 20 matches at least one approved hostname recognized by the vehicle telematics unit 30. When the vehicle telematics unit 30 receives a request to communicate via packet data, the request can include an Internet Protocol (IP) address of the requestor (e.g., the call center 20), the unit 30 can then establish a data connection to the DNS. Using the data connection, the vehicle telematics unit 30 can send the IP address of the requestor to the DNS for a reverse DNS (rDNS) lookup. For purposes of this discussion, the IP address of the third party requesting the packet data connection can be referred to as the IP address of the "requestor." Similarly, the terms "third party" and "call center" can be viewed interchangeably as well.

In cases when the IP address of the requestor belongs to the call center 20 or some other third party, the vehicle telematics unit 30 can make this determination based on the hostname associated with the call center 20/authorized third party IP address that is maintained in the DNS. It is possible that the rDNS lookup can be provided by a DNS that is separate from the primary/secondary DNSs discussed above that maintain the hostname/IP address combination for vehicle telematics units 30. Alternatively, the DNS that maintains the hostname/IP address combination for vehicle telematics units 30 could—in some implementations—provide the rDNS lookup if the DNSs were to monitor not only the hostname/IP addresses for the vehicle telematics units 30 but also other entities that are assigned IP address. As part of the rDNS lookup, the DNS can receive the IP address of the requestor that is sent by the vehicle telematics unit 30 and search the IP addresses the DNS maintains to locate the IP address of the requestor. When the DNS locates the IP address of the requestor, the DNS can identify the hostname associated with the IP address of the requestor and the hostname can be sent to the vehicle telematics unit 30.

When the vehicle telematics unit 30 receives the hostname corresponding to the IP address of the requestor, that hostname can be compared with one or more permitted or authorized hostnames. For example, the vehicle telematics unit 30 can maintain a list of hostnames that identify trusted third parties from which the unit 30 is permitted to receive data. If the received hostname that corresponds to the IP address of the requestor matches a hostname included with the list of trusted third parties, then the vehicle telematics unit 30 can be instructed to establish the packet data connection with the requesting party.

In one example, the vehicle telematics unit 30 can be instructed to include the hostname of the call center 20 in its list of trusted third parties stored at the vehicle 12. The list of trusted third party hostnames can be stored at the vehicle 12 when it is manufactured or it is also possible to update or change this list through over-the-air-programming (OTAP) techniques. The vehicle telematics unit 30 can receive a request from the call center 20 to establish a packet data connection; that request may include the IP address of the call center 20. And the IP address of the call center 20—regardless of which IP address the call center 20 is currently using—can be associated with the hostname of the call center 20 at the DNS. Put differently, the hostname of the call center 20 can remain constant while the IP address used by the call center 20 may change. The vehicle telematics unit 30 can send the IP address of the call center 20 requesting the packet data connection to the DNS, which can perform the rDNS lookup. That lookup can return to the vehicle telematics unit 30 the hostname of the call center 20 based on its IP address. The vehicle telematics unit 30 can then determine that the hostname of the call center 20 is included in the list of trusted or allowed third party hostnames and permit the request. In contrast, if an untrusted or blocked third party requests a packet data connection, the rDNS lookup will return the hostname associated with the IP address used by that third party. When the vehicle telematics unit 30 compares the hostname of the untrusted third party with the list of trusted third party hostnames, the unit 30 will not find a match and can then deny the request.

Figure 3:
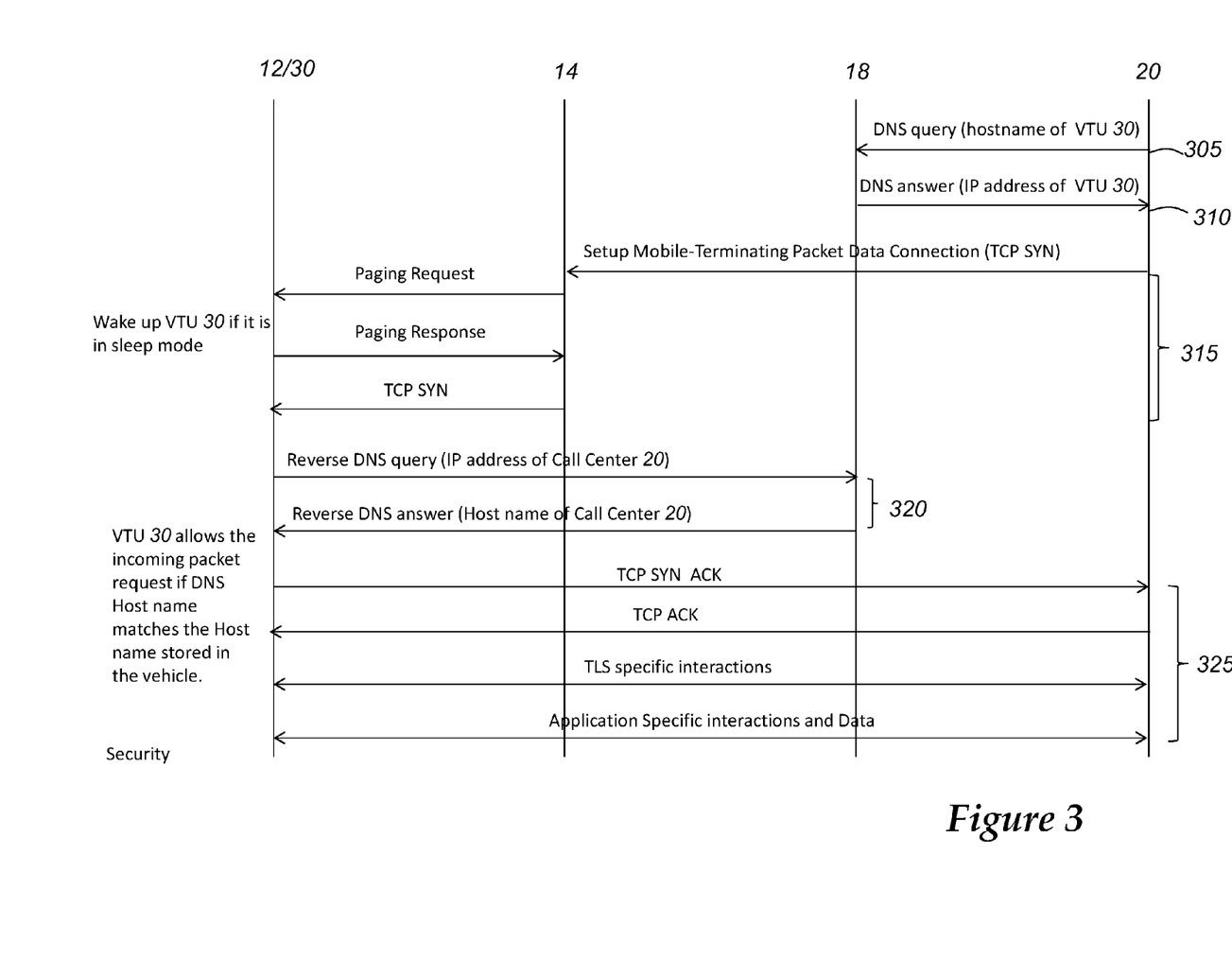
FIG. 3 is a call flow depicting an embodiment of a method of establishing a packet data connection.

Turning to FIG. 3, an exemplary call flow illustrating how a method of establishing a packet data connection can be carried out. In this example, the call flow begins at step 305 when the call center 20 decides to contact a particular vehicle 12. The call center 20 can then contact the DNS with a request for the IP address of the vehicle telematics unit 30 of the vehicle 12 the call center 20 plans to contact. The DNS is depicted as being maintained by computer 18 in this implementation. Thus, the call center 20 can send the request for the IP address of the vehicle telematics unit 30 of the vehicle 12 through the land network 16 to the computer 18. The request can include the hostname of the vehicle telematics unit 30. When the DNS server receives the request at computer 18 along with the hostname of the vehicle telematics unit 30, the DNS server can compare the received hostname of the vehicle telematics unit 30 with a plurality of stored hostnames. The plurality of stored hostnames can each be associated with an IP address at the DNS server. So, when the DNS server finds a match between the received hostname of the vehicle telematics unit 30 and one of the stored hostnames, the DNS server can then provide the IP address associated with the stored hostname that matches the hostname of the vehicle telematics unit 30 to the call center 20 at step 310.

Once the call center 20 receives the IP address of the vehicle telematics unit 30 of the vehicle 12, the call center 20 can use the IP address to set up a mobile-terminating packet data connection with the vehicle telematics unit 30 at step 315. The call center 20 can initiate such a connection by sending the IP address of the vehicle telematics unit 30 to the wireless carrier system 14, which can then page the vehicle telematics unit 30. As part of this paging process, the wireless carrier system 14 can also receive and provide the IP address of the call center 20 that initiated the mobile-terminated packet data connection to the vehicle telematics unit 30.

At step 320, the vehicle telematics unit 30 of the vehicle 12 can send the IP address of the call center 20 along with a request to perform an rDNS lookup to the DNS server located at the computer 18. The DNS server can then locate the hostname of the call center 20 using the IP address of the call center 20 as described above. The hostname of the call center 20 can then be sent from the DNS server to the vehicle telematics unit 30 at the vehicle 12. If the hostname of the call center 20 matches one of the approved hostnames stored at the vehicle 12, the vehicle telematics unit 30 can then send the call center 20 an acknowledgement that the unit 30 will accept the packet data connection at step 325 and establish the connection using packet data protocols, such as TCP.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a packet data connection, comprising the steps of:
   from a vehicle call center, providing a domain name server (DNS) resolution request to a selectively-accessible DNS for an IP address associated with a vehicle telematics unit of one of a plurality of vehicles, wherein the selectively-accessible DNS is maintained by a wireless carrier system, wherein the selectively-accessible DNS is configured to:
      for each of the plurality of vehicles, receive and store a hostname and a list of one or more IP addresses, wherein at least one of the one or more IP addresses is assigned by the wireless carrier system;
      receive DNS resolution requests from a plurality of requestors; and
      authenticate a respective identity of at least one of the plurality of requestors prior to providing an associated response to at least one of the respective DNS resolution requests,
      wherein, when the respective identity of the respective requestor is authenticated, the selectively-accessible DNS parses stored data in order to fill the respective request, and
      wherein, when the respective requestor is not authenticated, the respective request is not filled;
   providing the hostname of the vehicle telematics unit to the selectively-accessible DNS, wherein the provided hostname includes a vehicle identifier associated with the vehicle telematics unit;
   in response to the step of providing the hostname to the selectively-accessible DNS, receiving at the call center the IP address associated with the vehicle telematics unit; and
   initiating a mobile-terminated packet data connection from the call center to the vehicle telematics unit using the IP address obtained from the selectively-accessible DNS, wherein the vehicle telematics unit is configured to:
      receive a plurality of requests to establish the mobile-terminated packet data connection, wherein each of the requests includes an Internet Protocol (IP) address of the call center;
      in response to receiving each of the requests, send a reverse DNS lookup request, wherein the reverse DNS lookup request includes the IP address of the call center;
      in response to sending each of the reverse DNS lookup requests, receive a reverse DNS lookup response, wherein the reverse DNS lookup response includes a call center hostname corresponding to the IP address of the call center;
      for each of the received reverse DNS lookup responses, determine whether the call center hostname matches an authorized hostname that is stored at the vehicle; and
      for each of the plurality of requests, establish the mobile-terminated packet data connection when it is determined that the call center hostname matches the authorized hostname.

2. The method of claim 1, wherein the vehicle identifier includes a vehicle identification number (VIN).

3. The method of claim 1, further comprising the step of maintaining at the call center a list of vehicle hostnames, wherein each vehicle hostname represents a different vehicle telematics unit, wherein at least some of the list of vehicle hostnames are stored at the selectively-accessible DNS.

4. A method of establishing a packet data connection, comprising the steps of:
   from a vehicle call center, providing a domain name server (DNS) resolution request to a selectively-accessible dynamic DNS for a dynamic IP address associated with a vehicle telematics unit of one of a plurality of vehicles, wherein the selectively-accessible dynamic DNS is maintained by a wireless carrier system, wherein the call center is configured to provide one or more vehicle backend services to the vehicle telematics unit;
   providing a hostname of the vehicle telematics unit to the selectively-accessible dynamic DNS from the call center, wherein the provided hostname includes a vehicle identifier associated with the vehicle telematics unit;
   in response to the step of providing the selectively-accessible dynamic DNS the hostname, receiving at the call center the dynamic IP address associated with the vehicle telematics unit;
   initiating a mobile-terminated packet data connection from the call center to the vehicle telematics unit using the dynamic IP address obtained from the selectively-accessible dynamic DNS, wherein the vehicle telematics unit is configured to:
      receive a hostname update message from a remote server, wherein the hostname update message includes one or more approved hostnames;
      receive a plurality of connection requests to establish the mobile-terminated packet data connection;
      in response to receiving each of the connection requests, automatically performing a reverse domain name lookup using an IP address of the call center;
      in response to the performing each of the reverse domain name lookups, receive at the vehicle telematics unit a call center hostname; and for each of the plurality of connection requests, when the received hostname of the call center matches any of the one or more approved hostnames, establish the mobile-terminated packet data connection with the call center; and providing the one or more vehicle backend services to the vehicle telematics unit via the established mobile-terminated packet data connection.

5. The method of claim 4, wherein the vehicle identifier includes a vehicle identification number (VIN).

6. The method of claim 4, further comprising the step of maintaining at the call center a list of vehicle hostnames, wherein each vehicle hostname represents a different vehicle telematics unit, wherein at least some of the list of vehicle hostnames are stored at the selectively-accessible dynamic DNS.

7. The method of claim 4, wherein the selectively-accessible DNS is configured to:

for each of the plurality of vehicles, receive and store the vehicle hostname and a list of one or more dynamic IP addresses, wherein at least one of the one or more dynamic IP addresses is assigned by the wireless carrier system;

receive DNS resolution requests from a plurality of requestors; and attempt to authenticate an identity of each of the plurality of requestors prior to providing an associated response to each of the respective DNS resolution requests, wherein, when the identity of the respective requestor is authenticated, the selectively-accessible DNS parses stored data in order to fill the respective request, and wherein, when the respective requestor is not authenticated, the respective request is ignored.

* * * * *